(12) United States Patent
Burleigh et al.

(10) Patent No.: US 7,674,500 B2
(45) Date of Patent: Mar. 9, 2010

(54) PROCESS FOR PRESERVING WOOD USING FLUORO-MATERIALS

(75) Inventors: Malcolm B. Burleigh, St. Paul, MN (US); Thomas L. Hatfield, South St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 720 days.

(21) Appl. No.: 11/498,509

(22) Filed: Aug. 3, 2006

(65) Prior Publication Data

US 2007/0031677 A1 Feb. 8, 2007

Related U.S. Application Data

(60) Provisional application No. 60/706,172, filed on Aug. 5, 2005.

(51) Int. Cl.
*B05D 1/18* (2006.01)

(52) U.S. Cl. .................... 427/440; 427/439; 427/430.1; 427/230; 427/297

(58) Field of Classification Search ................. 427/439, 427/440, 372.2, 397
See application file for complete search history.

(56) References Cited

U.S. PATENT DOCUMENTS

| | | | |
|---|---|---|---|
| 4,325,993 A | | 4/1982 | Schroder |
| 4,439,070 A | * | 3/1984 | Dimmick .................... 405/216 |
| 4,539,047 A | | 9/1985 | Crockatt et al. |
| 4,950,329 A | * | 8/1990 | McIntyre et al. ......... 106/15.05 |
| 5,010,121 A | * | 4/1991 | Yeates et al. ................ 523/336 |
| 5,156,780 A | * | 10/1992 | Kenigsberg et al. ......... 264/424 |
| 5,183,845 A | | 2/1993 | Parkinson et al. |
| 5,344,956 A | | 9/1994 | Allewaert et al. |
| 5,783,258 A | | 7/1998 | Garapick |
| 5,990,212 A | | 11/1999 | Hager et al. |
| 6,045,865 A | | 4/2000 | Felby et al. |
| 6,248,402 B1 | | 6/2001 | Guyonnet et al. |
| 6,250,350 B1 | | 6/2001 | Muraki et al. |
| 6,294,608 B1 | | 9/2001 | Hager et al. |
| 6,428,902 B1 | | 8/2002 | Amundson et al. |
| 6,569,540 B1 | | 5/2003 | Preston et al. |
| 6,652,986 B2 | | 11/2003 | Peldszus et al. |
| 6,753,016 B2 | | 6/2004 | Ghosh |
| 6,953,501 B2 | | 10/2005 | Kelley et al. |
| 7,001,452 B2 | | 2/2006 | Zhang et al. |
| 7,056,846 B2 | | 6/2006 | Clark et al. |
| 2003/0136938 A1 | * | 7/2003 | Clark et al. ................ 252/8.62 |
| 2006/0100340 A1 | * | 5/2006 | Gao et al. ................... 524/475 |

FOREIGN PATENT DOCUMENTS

| | | |
|---|---|---|
| EP | 0 826 650 | 3/1998 |
| EP | 1 129 833 | 9/2001 |
| WO | WO 01/10922 | 2/2001 |
| WO | WO 03/048224 | 6/2003 |
| WO | WO 03/100159 | 12/2003 |

OTHER PUBLICATIONS

Forintek Canada Corp., by P.I. Morris, "Understanding Biodeterioration of Wood in Structures", pp. 1-23.

Wood and Fiber Science, 22(2), 1990, by the Society of Wood Science and Technology, "Fungal Resistance of Southern Pine Impregnated with Methyl Fluorophenyl Carbamates or Reacted with Fluorophenyl Isocyanates", by George C. Chin, Roger M. Rowell, and W. Dale Ellis, U.S. Department of Agriculture, Forest Service, Forest Products Laboratory, Madison, WI, pp. 165-172.

"Wood Conservation", [retrieved from internet on Jul. 27, 2006], URL <https://www.denix.osd.mil/denix/Public/ES-Programs/Conservation/Underwater/2-WOOD.html>, pp. 1-16.

"About Decay", [retrieved from internet on Jul. 27, 2006], URL <http://www.durable-wood.com/resistance/index.php>, 1 page.

\* cited by examiner

*Primary Examiner*—David Turocy
(74) *Attorney, Agent, or Firm*—Lisa P. Fulton

(57) ABSTRACT

A process for treating wood comprising at least partially penetrating it with a urethane- or acrylate-based fluoro-material. Also, wood produced by the process.

12 Claims, No Drawings

PROCESS FOR PRESERVING WOOD USING FLUORO-MATERIALS

CROSS REFERENCE TO RELATED APPLICATION

This application claims priority to U.S. Provisional Application No. 60/706,172 filed Aug. 5, 2005, which is incorporated by reference in its entirety.

FIELD

This invention relates to treatment of wood to improve the durability thereof. Wood treated in accordance with the invention is suitable for use in a variety of indoor and outdoor applications including, for example, use in decking material, wood furniture, wood siding, etc.

BACKGROUND

Wood has long been used as a material for a variety of articles, e.g., decking, furniture, structural framing and sheathing, etc. A natural product, wood tends to degrade when exposed to the environment, e.g., dampening or even soaking with water, etc. Such degradation can impair the aesthetic appearance of a wood article or construction or even degrade the structure integrity thereof, sometimes necessitating expensive maintenance, repairs, and replacement.

Accordingly it has been known to apply surface treatments, e.g., stains and paints, to wood articles to slow the degradation thereof. Current coating technologies can extend the life of the wood but require frequent maintenance and typically alter the appearance of the wood. A number of polyurethane and lacquer products are commercially available for this purpose. U.S. Pat. No. 4,539,047 (Crockatt et al.) discloses one example of a surface coating to protect wood.

It has also been known to impregnate wood, e.g., to penetrate it such as by pressure treating with preservative materials, e.g., so-called CCA or chromated copper arsenic formulations.

Some examples of materials and processes used to treat wood are disclosed in U.S. Pat. No. 4,325,993 (Schroder), disclosing use of solutions containing copper, chromium, and/or arsenic solutions; U.S. Pat. No. 5,783,258 (Garapick), disclosing use of white mineral oil and optional fungicide; U.S. Pat. No. 6,045,865 (Felby et al.), disclosing use of oxidase enzyme, impregnating substance, and oxidizing agents; U.S. Pat. No. 6,248,402 (Guyonnet et al.), disclosing a process comprising vacuum treatment, thermal treatment, impregnation, and polymerization; U.S. Pat. No. 6,250,350 (Muraki et al.), disclosing a pressure impregnation process; U.S. Pat. No. 6,428,902 (Amundson et al.), disclosing use of wax surfactant-water emulsions; U.S. Pat. No. 6,652,986 (Peldszus et al.), disclosing use of preservative agents based on metal compounds and impregnation with aqueous solution of salt of trimercapto-s-triazin, dithiocarbamate, or trithiocarbonate; U.S. Pat. No. 6,753,016 (Ghosh), disclosing use of compositions containing iron salts and oxidants and optional microbiocidal agents; U.S. Pat. No. 6,953,501 (Kelley et al.), disclosing use of a mixture of creosote and a polymer; and U.S. Pat. No. 7,001,452 (Zhang et al.), disclosing use of poly-aspartic acid free compositions of metal compounds, complexing agents, and vinyl-based polymers.

In recent years, concern has been raised about potential safety risks and environmental effects presented by some wood treatment approaches, leading to development of variations, e.g., alkaline copper quat- and copper azole-containing formulations and borate-based formulations.

Current pressure treated wood degrades too quickly for many long-term uses. This requires replacement of the finished product after an undesirably limited period of time. In addition, special finishes, fasteners, etc. may have to be used when using pressure treated wood in order to be compatible with the treatment material.

Plastic or fiberglass products may be made to appear similar to wood but are often deemed to be aesthetically lacking on some fashion as not being "real wood".

SUMMARY

The present invention provides novel treated wood that is at least partially impregnated with urethane- or acrylate-based fluoro-materials. The invention also provides a method for treating wood.

It has been surprisingly discovered that wood treated in accordance with the present invention will exhibit long term durability while retaining desirable aesthetic and working characteristics. The invention provides several advantages including desirable cost, appearance and longevity performance.

DETAILED DESCRIPTION OF ILLUSTRATIVE EMBODIMENTS

Wood

The present invention can be used with all species of wood including both hardwood and softwood varieties.

The present invention can be used with "underwater wood", "fresh cut wood" or "biologically degraded wood". Underwater wood is wood that has been recovered from bodies of water and typically has an open porous structure, which allows for a more complete impregnation and potentially longer lasting wood product. Fresh cut wood is wood that has been cut recently and typically contains large amounts of "sap". Biologically degraded wood is wood that has undergone some biodegradation of the "sap" and has partially open pores allowing a higher degree of penetration.

The present invention can be used with logs (though preferably debarked) as well as milled lumber. The invention can also be used with wood composites or laminates, e.g., particle board, "MDF" (medium density fiberboard), and "OSB" (oriented-strandboard).

Fluoro-Materials

The invention employs a urethane- or acrylate based fluoro-material that is applied in a substantially aqueous composition, e.g., solution or emulsion.

The wood treatment solution is made by dissolving or emulsifying the fluoro-material in an appropriate carrier solution (which may include other additives to improve solubility).

Examples of useful acrylate-based fluoro-materials may include fluoroacrylate polymers prepared from fluorinated acrylate and methacrylate monomers such as, but not limited to, 1H,1H,2H,2H-perfluorooctyl acrylate, 1H,1H,2H,2H-perfluorooctyl methacrylate, 1H,1H,2H,2H-perfluorodecyl acrylate, 1H,1H,2H,2H-perfluorodecyl methacrylate, and N-methyl-perfluorobutanesulfonamidoethyl acrylate.

In one preferred embodiment a urethane-based repellent fluoro-material is used in the present invention. Such urethane-based repellent fluoro-material is disclosed in U.S. Pat. No. 7,056,846 (Clark et al.), herein incorporated by reference. Such materials are fluorochemical urethane compounds formed from the reaction of (1) a di- or higher order isocyanate; (2) a stoichiometric amount of a reactive fluorochemical compound sufficient to react with at least 50% of the isocyanate (i.e., —NCO) groups; and (3) and optionally a stoichiometric amount of non-fluorochemical reactant sufficient to react with 20% or less of the isocyanate groups.

These above-described reactants provide a mixture of fluorochemical urethane compounds that are soluble in an organic solvent or readily emulsifiable in water, that may provide a thermally stable aqueous emulsion, and that is suitable for impregnation into wood via a variety of methods.

Such fluorochemical urethane compounds may be formed by reacting (a) the di- or higher order isocyanate with a reactive fluorochemical monofunctional compound, and (b) optionally with a limited amount of a non-fluorochemical isocyanate reactive compound. The reaction may be carried out in accordance with well-known techniques such as, for example, by condensation in a suitable solvent such as methyl isobutyl ketone (MIBK) using a small amount of a dibutyltin dilaurate catalyst. The urethane compound, formed in such a manner, may be emulsified in water or dissolved in an organic solvent and may optionally be combined with one or more suitable surfactants to aid in stabilizing the emulsion.

Any aliphatic isocyanates having two or greater isocyanate functionalities may be used in the preparation of the urethane-based fluoro-material. Among this class of useful compounds are aliphatic triisocyanate-functional biurets of the formula:

wherein x is an integer greater than or equal to 1, preferably 1 to 3, most preferably 1 and $R_h$ is a divalent noncyclic, linear or branched alkylene group and may be, for example, hexamethylene, ethylene, or butylene. Also useful are isocyanurate trimers of the formula:

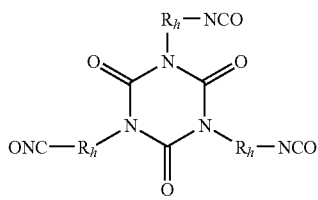

wherein $R_h$ is as previously described.

Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyfunctional isocyanate compounds generally provide better light stability than the aromatic compounds.

Examples of useful cycloaliphatic polyfunctional isocyanate compounds include, but are not limited to, those selected from the group consisting of dicyclohexylmethane diisocyanate ($H_{12}$MDI, commercially available as DESMODUR™ W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as DESMODUR™ N-100 and N-3200 from Bayer Corporation, Pittsburgh, Pa.), the isocyanurate of HDI (available as DESMODUR™ N-3300 and DESMODUR™ N-3600 from Bayer Corporation, Pittsburgh, Pa.), a blend of the isocyanurate of HDI and the uretdione of HDI (available as DESMODUR™ N-3400 available from Bayer Corporation, Pittsburgh, Pa.), and mixtures thereof.

Suitable commercially available polyfunctional isocyanates are exemplified by DESMODUR™ N-3200, DESMODUR™ N-3300, DESMODUR™ N-3400, DESMODUR™ N-3600, DESMODUR™ H (HDI), and DESMODUR™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl)propane to form triisocyanates. The product from the reaction with m-tetramethylxylene diisocyanate is commercially available as CYTHANE™ 3160 (American Cyanamid, Stamford, Conn.).

Because of their widespread commercial availability, polyisocyanate-functional biurets and isocyanurates derived from the homopolymerization of hexamethylene diisocyanate are preferred for use in accordance with this invention. Such compounds are sold, for example, under the DESMODUR tradename, whose products are available from Bayer Corporation, Pittsburgh, Pa.

Representative fluorochemical monofunctional compounds useful in forming the fluorochemical urethane compositions may be depicted by the formula:

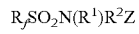

wherein:

$R_f$ represents a perfluoroalkyl or perfluoroheteroalkyl group having from 3 to 6 carbon atoms (longer chain materials can be used but are less preferred), more preferably having from about 3 to 5 carbon atoms; $R_f$ can contain straight chain, branched chain, or cyclic fluorinated alkylene groups or combinations thereof with straight chain, branched chain or cyclic alkylene groups; $R_f$ is preferably free of polymerizable olefinic unsaturation and can optionally contain catenary heteroatoms such as oxygen, divalent or hexavalent sulfur, or nitrogen; a fully fluorinated radical is preferred, but hydrogen or chlorine atoms may be present as substituents provided that not more than one atom of either is present for every two carbon atoms; the terminal portion of the $R_f$ group is fully fluorinated, preferably containing at least 7 fluorine atoms, e.g., $CF_3CF_2CF_2—$, $(CF_3)_2CF—$, $—CF_2SF_5$, or the like. Preferably, $R_f$ contains from about 40% to about 80% fluorine by weight, more preferably from about 50% to about 78% fluorine by weight; perfluorinated aliphatic groups (i.e., perfluoroalkyl groups of the formula $C_nF_{2n+1}—$) are the most preferred embodiments of $R_f$; $R^1$ is a hydrogen or lower alkyl group, such as a $C_1$ to $C_4$ alkyl group; $R^2$ is an alkylene group or heteroalkylene group, preferably a $C_1$ to $C_4$ alkylene group; and Z is a functional group capable of reacting with the isocyanate groups f the polyisocyanate. Useful Z groups include, but are not limited to $—NH_2$, $—SH$, $—OH$, $—NCO$, $NR^1H$, where $R^1$ is as previously defined.

A mixture of one or more such fluorochemical monofunctional compounds are also considered useful.

Representative fluorochemical monofunctional compounds include invention including both low molecular weight and oligomeric diols. Also, mixtures of diols can be used.

Low molecular weight (less than about 500 number average molecular weight) alcohols may be used to provide preferred characteristics to the fluorochemical urethanes. Some representative examples of these are ethylene glycol; propylene glycol; polypropylene glycol monobutyl ether, 1,3-propane diol; 1,4-butane diol; 1,5-pentane diol; 1,6-hexane diol, neopentyl glycol; diethylene glycol; dipropylene glycol, octadecyl alcohol, dodecanol. It is further noted that for any of the reactants mentioned, mixtures of materials can be utilized. Useful amines include, for example, having at least one amino group that is either secondary or primary. Examples are 1,10-diaminodecane, 1,12-diaminododecane, aminophenyl)ethylamine, 1,4-butanediol bis(3-aminopropyl) ether, 1,8-diamino-p-menthane, 4,4'-diaminodicyclohexylmethane, 1,3-bis(3-aminopropyl)tetramethyldisilox-

TABLE 1

| | |
|---|---|
| $CF_3(CF_2)_3SO_2N(CH_3)CH_2CH_2OH$, | $CF_3(CF_2)_3SO_2N(CH_3)CH(CH_3)CH_2OH$, |
| $CF_3(CF_2)_3SO_2N(CH_3)CH_2CH(CH_3)NH_2$, | $CF_3(CF_2)_3SO_2N(CH_2CH_3)CH_2CH_2SH$, |
| $CF_3(CF_2)_3SO_2N(CH_3)CH_2CH_2SCH_2CH_2OH$, | $C_6F_{13}SO_2N(CH_3)(CH_2)_4OH$, |
| $CF_3(CF_2)_5SO_2N(H)(CH_2)_3OH$, | $C_3F_7SO_2N(CH_3)CH_2CH_2OH$, |
| $CF_3(CF_2)_4SO_2N(CH_3)(CH_2)_4NH2$, | $C_4F_9SO_2N(CH_3)(CH_2)_3OH$, |
| $CF_3(CF_2)_5SO_2N(CH_2CH_3)CH_2CH_2OH$, | $CF_3(CF_2)_5SO_2N(C_2H_5)(CH_2)_4OH$, |
| $CF_3(CF_2)_2SO_2N(C_2H_5)(CH_2)_4OH$, | $CF_3(CF_2)_3SO_2N(C_3H_7)CH_2OCH_2CH_2CH_2OH$, |
| $CF_3(CF_2)_4SO_2N(CH_2CH_2CH_3)CH_2CH_2OH$, | $CF_3(CF_2)_4SO_2N(CH_2CH_2CH_3)CH_2CH_2NCH_3H$, |
| $CF_3(CF_2)_3SO_2N(C_4H_9)CH_2CH_2NH_2$, | $CF_3(CF_2)_3SO_2N(C_4H_9)(CH_2)_4SH$, |

Representative fluoroaliphatic alcohols that can be used in the present invention include those having the formula:

$$C_nF_{2n'+1}(CH_2)_{m'}OH,$$

where n' is 3 to 14 and m' is 1 to 12;

$$(CF_3)_2CFO(CF_2CF_2)_{p'}CH_2CH_2OH,$$

where p' is 1 to 5;

$$C_nF_{2n'+1}CON(R^3)(CH_2)_{m'}OH,$$

where $R^3$ is H or lower alkyl, n' is 3 to 14, m' is 1 to 12;

$$C_nF_{2n'+1}SO_2N(R^3)(CH_2)_{m'}OH,$$

where $R^3$, n', and m' are described above; and $$C_nF_{2n'+1}SO_2NR_3(CH_2)_{m'}((OCH_2C(H)(CH_2Cl))_{r'}OH,$$

where $R^3$, n', m' are described above, and r' is 1 to 5.

The above-described polyfunctional isocyanates can also be reacted with co-reactants comprising one or more isocyanate-reactive groups. Isocyanate-reactive groups have a general structure —Z—H, wherein Z is selected from the group consisting of O, N, and S. Preferably, Z is O or N.

Suitable isocyanate-reactive materials include, for example, polyols, polyamines, and polythiols. As used herein, the prefix "poly" means one or more. For example, the term "polyols" includes monohydric alcohols diols, triols, tetraols, etc.

A preferred class of isocyanate reactive materials is polyols. The term "polyol" as used herein refers to mono or polyhydric alcohols containing an average of one or more hydroxyl groups and includes, for example, monohydric alcohols, diols, triols, tetraols, etc.

A preferred class of polyols is monohydric alcohols and diols. A variety of diols may be utilized according to the ane, 1,8-diamino-3,6-dioxaoctane, 1,3-bis(aminomethyl) cyclohexane, 1,4-bis(3-aminopropyl)piperazine, and the like. In the case of difunctional reactants one isocyanate reactive group may be an alcohol and the other may be an appropriate amine.

Examples of polythiols include 2,2'-oxydiethanethiol, 1,2-ethanethiol, 3,7-dithia-1,9-nonanedithiol, 1,4-butanedithiol, 1,6-hexanedithiol, 1,7-heptanedithiol, 1,8-octanedithiol, 1,9-nonanedithiol, 3,6-dioxa-1,8-octanedithiol, 1,10-decanedithiol, 1,12-dimercaptododecane, and the like.

Preparation of Wood Treatment Solutions

The fluorochemical urethane compositions useful in the present invention can be made according to the following step-wise synthesis. As one skilled in the art would understand, the order of the steps is non-limiting and can be modified so as to produce a desired chemical composition. In the synthesis, the polyfunctional isocyanate compound and the fluorochemical monofunctional compound(s) are dissolved together under dry conditions, preferably in a solvent, and then heating the resulting solution at approximately 40 to 80° C., preferably approximately 60 to 70° C., with mixing in the presence of a catalyst for one-half to two hours, preferably one hour. Depending on reaction conditions (e.g., reaction temperature and/or polyfunctional isocyanate used), a catalyst level of up to about 0.5 percent by weight of the polyfunctional isocyanate/fluorochemical monofunctional compound mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred.

The resulting isocyanate functional urethane oligomers and compounds may then further reacted with one or more of the aliphatic monofunctional compounds described above. The monofunctional compounds are added to the above reaction mixture, and react(s) with up any remaining available —NCO groups. The above temperatures, dry conditions, and mixing are continued one-half to two hours, preferably one hour. Terminal fluorine-containing and optionally non-fluorinated aliphatic groups are thereby bonded to the urethane compounds.

Each fluorochemical urethane compound comprises a urethane group that is derived or derivable from the reaction of at least one polyfunctional isocyanate compound and at least one fluorochemical monofunctional compound. The fluorochemical urethane compound is terminated with (i) one or more perfluoroalkyl groups, or one or more perfluoroheteroalkyl groups; and (ii) optionally one or more non-fluorinated aliphatic groups. It will be understood that the reaction product will provide a mixture of compounds, some percentage of which will comprise compounds as described, but may further comprise urethane compounds having different substitution patterns and degree of substitution. Thus the compositions may include compounds of the formula:

$(R_f^*)_n A(NHCO—Z'R''')_{m-n}$, wherein $R_f^*$ is $R_f$—$SO_2N(R^1)$—$R^2$—$Z'$, $Z'$ is the residue of Z, A is the residue of said aliphatic isocyanate, having valency m, R''' is an aliphatic radical derived from the aliphatic monofunctional compound, and n (average) is at least 1.5, preferably at least 2.

The wood treatment composition is prepared by dissolving or emulsifying the fluorochemical urethane composition in an appropriate carrier solution (which may include other additives to improve solubility). Treatment compositions preferably contain from about 0.1 to about 10 weight percent fluorochemical urethane composition, based on the weight of the treatment composition. Preferably the fluorochemical urethane composition is used in the treatment composition at about 0.05 to about 10 weight percent, more preferably from about 0.1 to about 3 weight percent. Suitable solvents include water, alcohols, esters, glycol ethers, amides, ketones, hydrocarbons, chlorohydrocarbons, chlorocarbons, and mixtures thereof. Water is the preferred solvent because it does not raise any environmental concerns and is accepted as safe and non-toxic. In order to cause the particle size to become sufficiently small under the process of emulsion formation it may be necessary to add a certain amount of an emulsification surfactant to the aqueous solution, as is known in the art.

It may also be desirable to add additional surfactants that do not substantially contribute to the reduction in particle size. Use of additional surfactant is frequently desirable when the solution will be substantially diluted, be exposed to conditions of high shear or where the emulsion contacts materials with high internal surface area, such as is seen in the structure of wood. The treatment of wood possesses all these qualities and for these reasons is often desirable to add extra surfactant.

These additional surfactants may either be of the same polarity as the original surfactant or may be nonionic surfactants, which do not possess polarity. They may be added at anytime during the process, either before emulsification, to the emulsion or after dilution in the treatment bath. The list of possible surfactants that are useful in the present invention is long and may include anionic, cationic, nonionic and amphoteric surfactants. In one embodiment the surfactant is a nonionic surfactant. Nonionic surfactants useful in the present invention include ethoxylates, such as those sold under the tradename TERGITOL, available from Dow Chemical Company. The amount of surfactant will vary with the application conditions; however we have typically used about 15% nonionic surfactant based upon the solids weight of the emulsion.

In order to treat the wood it may be desirable to add certain solvents into the emulsion known as coalescing agents. These coalescing solvents typically have a higher boiling point than water. Their evaporation rate is so slow that after the water has evaporated these materials still will have not evaporated to a significant extent. In this way when they eventually dry, the fluorochemical tails, may align on the surface. The alignment of the fluorochemical tails is a necessary condition for the development of repellency. Normally in many operations this is done with heat but since heat is not always available in the wood drying process, coalescing solvents are added. Typical coalescing solvents may include but are not limited to ester alcohols such as TEXANOL™, 2,2,4-trimethylpentanediol monoisobutyrate, available from Eastman Chemical Company, Kingsport, Tenn., tributyl citrate and triethylcitrate. The list of coalescing solvents is fairly extensive. For our purposes their main attributes would be that they dissolve the fluorochemical, are sparingly soluble in water and possess a boiling point substantially higher than that of water.

We have found that the coalescing solvent may be added to the emulsion at several stages with positive results, either before or after emulsification. If enough coalescing solvent is added to the emulsion, then the emulsion is no longer composed of solid emulsion particles, but is actually a liquid dispersed in water. We have found that this to be beneficial for penetration into the wood, since it appears that the liquid emulsion particles penetrate readily into the wood.

In order to test for optimum solubility the fluoro-material itself is heated in the coalescing solvent at various concentrations and left at ambient temperature. Eventually the higher concentrations may either coagulate or crystallize out of solution. The highest concentration that does not come out of solution may be added to the emulsion. Alternatively the desired amount of coalescing solvent may be added to the fluoro-material prior to emulsification The wood treatment solution may also further contain additives to improve performance such as biocides to inhibit bacterial degradation, photostabilizers to make the product more resistant to photodegradation, and pigments to impart a desired color. Other additives such as flame retardants may also be used if desired. Photostabilizers may be reacted into the urethane molecule if they contain the proper groups such as an alcohol on amine group on their molecule.

Since it is more economical to treat the wood using fluorochemicals in an aqueous system rather than in organic solvent, emulsions of the fluorochemicals may be prepared. There are many ways to prepare these emulsions. Acrylic emulsions may be prepared by polymerizing the material in the presence of an emulsifier. Typically urethanes emulsions are prepared by a post emulsification process after the material has been synthesized.

Wood Treatment Process

The wood to be treated is preferably first dried to a low moisture content (preferably 8 weight percent or lower), e.g., using conventional kiln techniques, by storage under ambient conditions where appropriate, etc. In some instances, a structure may be erected using the wood and allowed to stand such that the wood dries.

The wood is then impregnated with a urethane- or acrylate-based fluoro-material. For instance, the wood can be immersed in a bath of the treatment solution for a sufficient time and under sufficient conditions for the treatment composition to seep into or impregnate the wood. As will be understood, the time and conditions will depend in part upon such factors as porosity of the wood, temperature of the wood and bath, pressure, moisture content of the wood, desired degree of penetration, etc.

In some instances, particularly where the wood is relatively drier, application can be accomplished by contacting the wood to a reservoir of the composition and the wood will then absorb the composition. For example, one end of a piece of wood to be treated may be dipped into the composition in a vessel such that the composition is wicked into the wood. In some instance, the treatment composition can be applied to the wood by pouring, spraying, or with a brush, and permitting it to absorb into the wood. These application methods can be used to treat existing structures of wood in accordance with the invention.

The treatment should be applied so as to impregnate the wood to a desired depth or thickness. This will be dependent in part upon the intended application of the treated wood, the thickness of the wood being treated, etc. Typically, it is preferred that the impregnation process is carried out such that the treatment composition penetrates at least the outer one fifth, more preferably at least the outer third, of the thickness of the wood. In some instances, greater penetration will be desired, even complete penetration in some instances. Those with ordinary skill in the art will readily understand how to carry out desired treatment so as to obtain desired penetration.

Preferably, following impregnation and removal from the bath, the impregnated wood is kiln dried to a moisture content of about 10 to 15 weight percent. In some embodiments, the dried wood will then be lightly sanded, and if desired, a final coating of the same or a different fluoro-material is applied to the wood surface by dipping the wood in a bath. The finished wood is then air-dried prior to use.

The finished wood will be comparable in price but will outperform low-grade materials currently on the market. The wood will perform as well as high-grade plastic materials but is significantly cheaper.

The treated wood looks like real wood because it is real wood. The addition of pigment to the formulation allows the color to be altered to match consumer taste without hiding the natural grain patterns in the wood. The wood surface has a high degree of stain resistance and is washable.

In absence of severe abrasion of the surface, treated underwater wood will look and behave the same in 25 years or longer as it did the day it was purchased. Under this same constraint, biologically degraded wood will typically last on the order of 15 to 20 years and fresh cut wood will typically last at least 10 years. As the treated wood is waterproof, there is less twisting, warping, and cupping than with regular wood products. Only certain plastic materials can approach these performance lifetimes without maintenance.

Wood treated in accordance with the invention may be used for desired exterior and interior applications. For example, it could be used in furniture, siding, windows, doors, flooring, decking, docks, etc.

EXAMPLES

The following examples are offered to aid in a better understanding of the present invention. These examples are not to be construed as an exhaustive compilation of all embodiments of the present invention and are not to be unnecessarily construed as limiting the scope thereof.

Materials

TABLE 2

| Designation | Material/Structure | Availability/Preparation |
|---|---|---|
| DBTDL | Dibutyltin dilaurate; $[CH_3(CH_2)_3]_2Sn[CO_2(CH_2)_{10}CH_3]_2$ | Sigma-Aldrich Co., Milwaukee, WI |
| MeFBSE | N-methylperfluorobutanesulfonyl ethanol; $C_4F_9SO_2N(CH_3)CH_2CH_2OH$ | Made by reacting perfluorobutanesulfonyl fluoride with $CH_3NH_2$ and ethylene chlorohydrin, essentially as described in Ex. 1 of U.S. Pat. No. 2,803,656 (Ahlbrecht, et al.) |
| MIBK | Methylisobutyl ketone; $(CH_3)_2CHCH_2C(O)CH_3$ | Sigma-Aldrich Co. |
| TEXANOL | 2,2,4-trimethylpentanediol monoisobutyrate | Eastman Chemical Co., Kingsport, TN |
| N-3300 | DESMODUR ™ N 3300A; Polyfunctional isocyanate resin based on hexamethylene diisocyanate | Bayer Corporation, Pittsburgh, PA |
| SA | Stearyl alcohol; $CH_3(CH_2)_{16}CH_2OH$ | Sigma-Aldrich Co. |
| TERGITOL 15-S-30 | Secondary alcohol ethoxylate | Dow Chemical Company Co. |
| DOWFAX 8390 | Hexadecyldiphenyloxide disulphonate (35% active) | Dow Chemical Co. |

Preparation of MeFBSE/N-3300/SA Urethane

A 3000 mL round bottom flask equipped with a magnetic stirrer and fitted with a condenser was charged with MeFBSE (286.0 grams), MIBK (500.0 grams), SA (29.0 grams) and N-3300 (186.0 grams). Upon dissolution, the mixture was heated to reflux, DBTDL (0.1 grams) was added, and heating was continued for one hour at 80° C. The solution was cooled, and yielded MeFBSE/N3300/SA Urethane.

Preparation of MeFBSE/N3300 Urethane Emulsion

To a 3000 mL stainless steel beaker equipped with a magnetic stirrer was added a solution of Dowfax 8390 (71.4 grams) in DI water (1600 grams). The temperature was kept between 65° C. and 73° C. during addition. MeFBSE/N-3300/SA Urethane was added to the beaker without cooling. The solution was sonicated with a Cole-Parmer ultrasonic homogenizer (Model CPX 600, available from Cole-Parmer, Vernon Hills, Ill.) for five minutes. The solvent was then removed using a rotary evaporator.

Preparation of Wood Treatment Emulsion

The MeFBSE/N3300 Urethane emulsion prepared above (2000 grams) was placed into a 3000 mL stainless steel beaker equipped with a three-blade mixer and a hot plate. Water (1025 grams) was added to the beaker and heating and stirring were commenced. TEXANOL™ (1500) grams and TERGITOL™ 15-S-30 (75 grams) were added and the beaker was carefully covered with foil to inhibit evaporation. The mixture was heated to 90° C. and held at that temperature for 15 minutes. The mixture was placed into a container and allowed to cool.

Impregnation

The wood product emulsion was diluted to a 30/1 concentration. Untreated deck boards of underwater Northern White Pine were placed into the treatment chamber and the chamber was evacuated for 15 minutes. After that the treatment solution was allowed to enter the chamber and cover the wood. When the wood was covered with the solution, the pressure was raised to 90 psi for 80 minutes.

With the Northern White Pine the average pick-up was 150% of the weight of the wood indicating a substantial amount of wet pickup.

The treated wood was dried in a wood kiln and also at ambient conditions. Repellent properties were observed at the end of the drying processes.

Various modifications and alterations of this invention will become apparent to those skilled in the art without departing from the scope and spirit of this invention.

What is claimed is:

1. A process for preserving wood comprising a) providing a composition containing a urethane- or acrylate-based fluoro-material and b) applying said composition to wood such that said composition penetrates at least partially into said wood and c) drying said wood such that said fluoro-material remains within said wood; wherein applying said composition comprises placing said wood into an evacuation chamber, substantially removing air from said wood by evacuation, and allowing said composition to enter said chamber;
   wherein said composition comprises a urethane-based fluoro-material, 2,2,4-trimethylpentanediol monoisobutyrate, water, and an ethoxylate.

2. The process of claim 1 further comprising applying elevated pressure to said chamber.

3. The process of claim 1 wherein said fluoro-material is a urethane-based fluoro-material comprising the reaction product of (1) a di- or higher order isocyanate compound and (2) a stoichiometric amount of an isocyanate reactive fluorochemical compound sufficient to react with at least 50% of the isocyanate groups in said isocyanate compound.

4. The process of claim 3 further including a stoichiometric amount of an isocyanate reactive non-fluorochemical compound sufficient to react with 20% or less of the isocyanate groups in said isocyanate compound.

5. The process of claim 1 wherein said composition is in the form of a substantially aqueous emulsion and includes an emulsification surfactant.

6. The process of claim 5 wherein additional surfactant is added to said emulsion.

7. The process of claim 6 wherein said additional surfactant has the same polarity as said emulsification surfactant or is a nonionic surfactant.

8. The process of claim 7 wherein said surfactant is a nonionic surfactant and is present at about 15 weight percent based on the total solids weight of said emulsion.

9. The process of claim 6 wherein said composition further includes a sufficient amount of a coalescing solvent such that said fluoro-material would be completely soluble in said coalescing solvent at the temperature of treatment.

10. The process of claim 9 wherein said coalescing solvent is present at about 75 weight percent based on the total solids weight of said emulsion.

11. The process of claim 1 wherein said wood being treated is underwater wood.

12. The process of claim 1 wherein said wood is dried under ambient conditions.

* * * * *